United States Patent
Ibrahim et al.

(10) Patent No.: US 10,562,605 B2
(45) Date of Patent: Feb. 18, 2020

(54) VEHICLE LUMINOUS COMPOSITE FLOOR PANEL

(71) Applicant: THE BOEING COMPANY, Chicago, IL (US)

(72) Inventors: Yakentim M. Ibrahim, Brier, WA (US); Karen L. Hills, Everett, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 15/679,279

(22) Filed: Aug. 17, 2017

(65) Prior Publication Data
US 2019/0054996 A1    Feb. 21, 2019

(51) Int. Cl.
| F21S 8/02 | (2006.01) |
| B64C 1/18 | (2006.01) |
| B64D 47/02 | (2006.01) |
| B60Q 3/00 | (2017.01) |
| B32B 3/12 | (2006.01) |
| F21Y 115/10 | (2016.01) |

(52) U.S. Cl.
CPC ............ B64C 1/18 (2013.01); B32B 3/12 (2013.01); B60Q 3/00 (2013.01); B64D 47/02 (2013.01); F21S 8/022 (2013.01); *F21Y 2115/10* (2016.08)

(58) Field of Classification Search
CPC .. B64C 1/18; B64D 47/02; B64Q 3/00; B32B 3/12; F21S 8/02; F21S 8/022; F21V 33/006; F21Y 2101/02; F21Y 2115/10; B60Q 3/51
USPC ................................................ 362/153, 488
See application file for complete search history.

(56) References Cited

U.S. PATENT DOCUMENTS

| 3,663,808 | A  | * | 5/1972  | Baatz    | F21V 33/006 |
|           |    |   |         |          | 362/152     |
| 6,667,089 | B1 |   | 12/2003 | Barker   |             |
| 6,676,199 | B2 | * | 1/2004  | Buisson  | B32B 3/12   |
|           |    |   |         |          | 296/193.07  |
| 7,182,291 | B2 |   | 2/2007  | Westre et al. |        |
| 7,545,517 | B2 | * | 6/2009  | Rueb     | B25H 7/00   |
|           |    |   |         |          | 356/614     |

(Continued)

FOREIGN PATENT DOCUMENTS

| CA | 2897057 A1 | 1/2016 |
| EP | 1041211 A2 | 10/2000 |
| EP | 3235720 A1 | 10/2017 |

OTHER PUBLICATIONS

Extended European Search Report for corresponding EP Application No. 18182349.3-1010 dated Dec. 12, 2018 (6 pages).

*Primary Examiner* — Y M. Lee
(74) *Attorney, Agent, or Firm* — Philip S. Hof; The Small Patent Law Group, LLC

(57) ABSTRACT

A composite floor panel includes a cover sheet, a base sheet, a core layer, and a plurality of light sources. The cover sheet has a user-facing side and an underside that is opposite from the user-facing side. The base sheet is below the underside of the cover sheet. The core layer includes a plurality of honeycomb cells bonded to one another. The core layer is disposed between the cover sheet and the base sheet. The light sources are configured to emit light through the cover sheet to provide lighting effects above the user-facing side of the cover sheet. The light sources are disposed between the user-facing side of the cover sheet and the core layer.

20 Claims, 7 Drawing Sheets

(56) References Cited

U.S. PATENT DOCUMENTS

| | | | | |
|---|---|---|---|---|
| 7,670,022 | B2* | 3/2010 | Kessler | A47L 23/266 |
| | | | | 362/153 |
| 7,988,809 | B2 | 8/2011 | Smith et al. | |
| 8,388,184 | B2* | 3/2013 | Van Herpen | D05C 17/02 |
| | | | | 174/482 |
| 8,444,287 | B2* | 5/2013 | Hardesty | E04F 15/02166 |
| | | | | 15/216 |
| 8,974,073 | B2* | 3/2015 | Van Herpen | A47G 27/0243 |
| | | | | 362/127 |
| 9,347,634 | B2* | 5/2016 | Salter | F21S 48/00 |
| 9,625,131 | B2* | 4/2017 | Kim | G02B 6/0088 |
| 9,758,991 | B2* | 9/2017 | Lin | E05B 47/00 |
| 2007/0247842 | A1* | 10/2007 | Zampini | F21S 2/00 |
| | | | | 362/227 |
| 2010/0265731 | A1 | 10/2010 | Van Herpen et al. | |
| 2014/0362575 | A1* | 12/2014 | Shirilla | F21V 21/145 |
| | | | | 362/249.08 |
| 2018/0038578 | A1* | 2/2018 | Son | F21V 31/00 |

\* cited by examiner

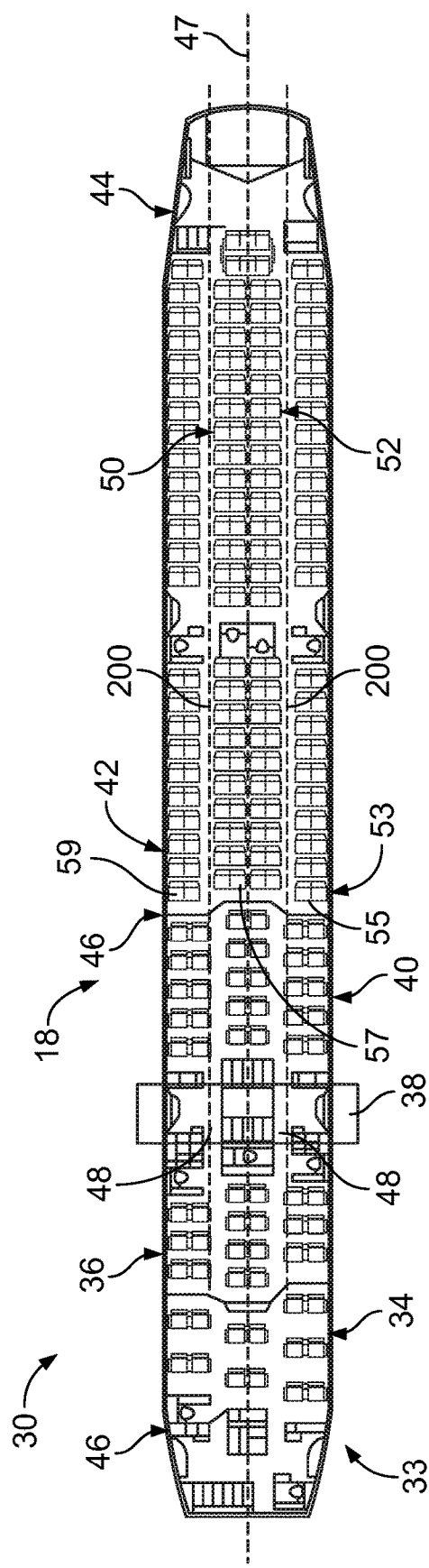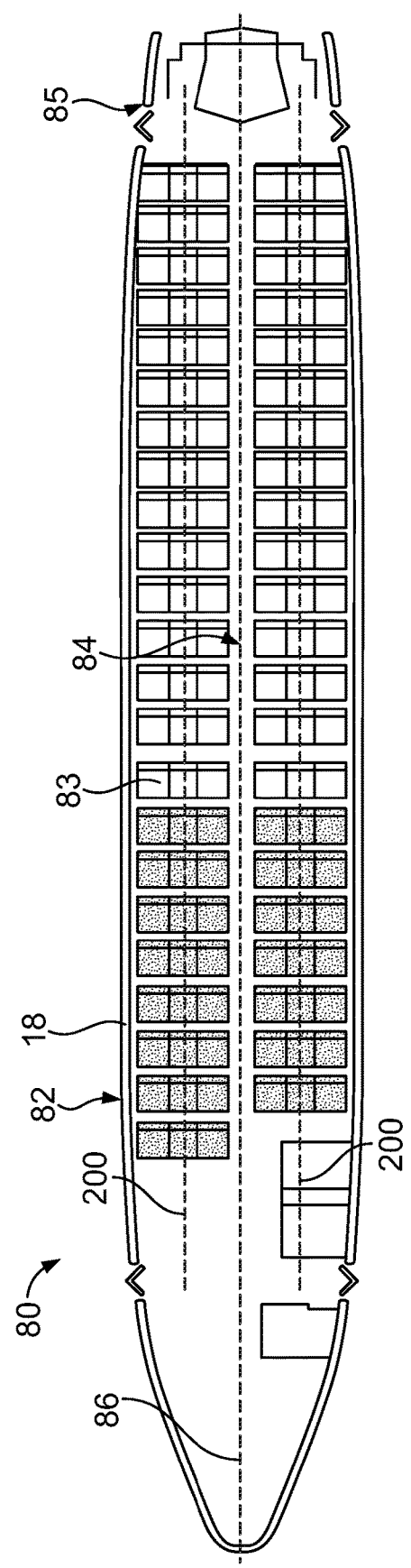
FIG. 2A
FIG. 2B

VEHICLE LUMINOUS COMPOSITE FLOOR PANEL

FIELD

Embodiments of the present disclosure generally relate to interior spaces within vehicles, for example, cabins within commercial aircraft, and, more particularly, to luminous composite floor panels, such as for carpet display systems in interior cabins of vehicles.

BACKGROUND

Commercial aircraft typically include an interior cabin that may be divided into numerous sections. A cockpit is generally separated from a passenger cabin, which may include a first class section, a business class section, and an economy section. The passenger cabin may also include one or more work areas for flight personnel, such as galleys, which may include food and beverage storage structures. One or more aisles pass through the passenger cabin and connect each of the passenger sections to one or more doors of the aircraft.

Various commercial aircraft include carpet throughout an interior cabin. The carpet may be customized with respect to appearance and aesthetics. For example, an aircraft operator may prefer a particular color of carpet for each aircraft within a fleet. As another example, the carpet may include portions that show text, designs, illustrations, or the like, such as a particular pattern, company name, trade name, trademark, slogan, logo, or the like. Images may also be projected onto the carpet from a projector, although the images would be disrupted if there is an obstruction between the projector and the carpet. As can be appreciated, once a particular carpet scheme is determined and installed within a commercial aircraft, the resulting carpet appearance is fixed. If an operator prefers a different carpet aesthetic, the carpet within the aircraft has to be replaced.

SUMMARY

A need exists for selectively adapting a carpet aesthetic within an aircraft, for example. A need exists for an efficient and effective way of incorporating a luminous carpet display system within an interior cabin of a vehicle, such as an aircraft.

With those needs in mind, certain embodiments of the present disclosure provide a luminous composite floor panel, such as within an interior cabin of a vehicle. The composite floor panel includes a cover sheet, a base sheet, a core layer, and a plurality of light sources. The cover sheet has a user-facing side and an underside that is opposite from the user-facing side. The base sheet is below the underside of the cover sheet. The core layer includes a plurality of honeycomb cells bonded to one another. The core layer is disposed between the cover sheet and the base sheet. The light sources are configured to emit light through the cover sheet to provide lighting effects above the user-facing side of the cover sheet. The light sources are disposed between the user-facing side of the cover sheet and the core layer.

In at least one embodiment, the cover sheet is translucent. In one or more other embodiments, the cover sheet is opaque and includes a plurality of holes that extend through the cover sheet between the user-facing side and the underside. Each of the holes is aligned with an individual one of the light sources.

In at least one embodiment, the light sources are mounted to the cover sheet along the underside. The cover sheet further includes conductive elements embedded therein that are electrically connected to the light sources for providing electric current to the light sources.

In one or more embodiments, the light sources are disposed on an illumination layer that is located between the cover sheet and the core layer. The illumination layer may include one or more substrates on which the light sources and conductive elements, which provide electrical current to the light sources, are mounted.

The light sources may be electrically connected via conductive elements to an edge connector that is configured to releasably electrically connect with an electrical power source. Optionally, the electrical power source may be another composite floor panel, such that the floor panels link together in a chain.

Certain embodiments of the present disclosure provide a method of producing a composite floor panel for an interior cabin of a vehicle. The method includes forming a light permeable cover sheet having a user-facing side and an underside that is opposite from the user-facing side. The method also includes providing a core layer and a base sheet below the underside of the cover sheet such that the core layer is between the cover sheet and the base sheet. The core layer includes a plurality of honeycomb cells bonded to one another. The method includes providing a plurality of light sources between the user-facing side of the cover sheet and the core layer. The light sources are positioned relative to the cover sheet such that light emitted from the light sources provides lighting effects above the user-facing side of the cover sheet.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein:

FIG. 2A illustrates a top plan view of an interior cabin of an aircraft according to an embodiment of the present disclosure;

FIG. 2B illustrates a top plan view of an interior cabin of an aircraft according to another embodiment of the present disclosure;

DETAILED DESCRIPTION

Figure 1:
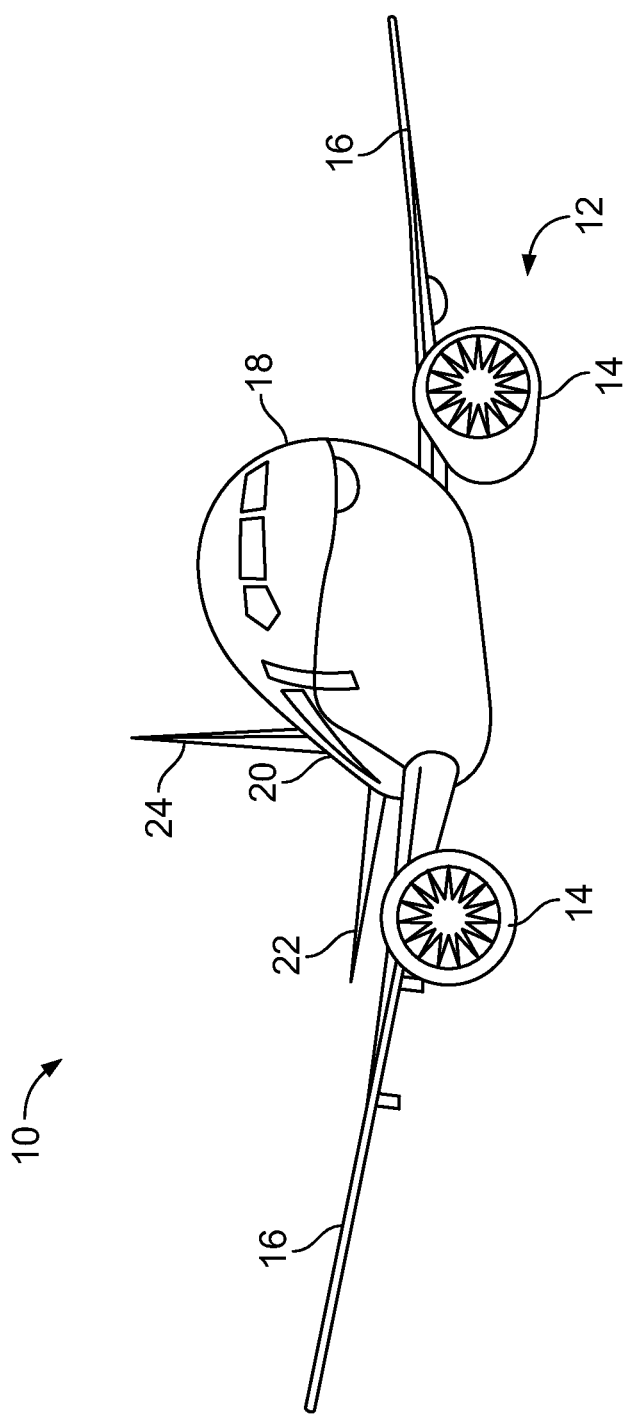
FIG. 1 illustrates a front perspective view of an aircraft according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Light-transmissive carpet tiles have been developed for certain applications, such as within commercial and residential buildings. A typical light-transmissive carpet tile includes an array of light-emitting diodes (LEDs) secured to a backing that supports carpet fibers. The backing is translucent and allows light emitted by the LEDs to pass through, thereby providing lighting effects on the carpet fibers.

The embodiments herein recognize and take into account that known light-transmissive carpet tiles are unable to be used with respect to commercial aircraft. In particular, each light-transmissive carpet tile includes a large, heavy, and bulky control system. Attempting to utilize such carpet tiles within the limited confines of an airplane cabin would add substantial weight to the aircraft (which, in turn, would cause the aircraft to consume increased amounts of fuel). Further, incorporating the LEDs into the backing layer of the carpet may not adequately protect the LEDs and other electrical elements, such as wires and circuitry, from damage caused by passengers. For example, acute structural loading on the carpet caused by dropped luggage or certain types of shoes could crush the LEDs in the backing material. Also, although the backing may be translucent, the pile in known light-transmissive carpet tiles is colored and generally opaque. Due to the significant amount of attenuation through the carpet tiles, the LEDs emit light at a high energy level (e.g., luminous intensity and/or frequency) to provide lighting effects through the carpet that are clearly visible to passengers above the carpet. Driving the LEDs to emit such high energy light typically requires a substantial amount of electrical power, which may not be available on the aircraft and/or desirable due to an increased amount of fuel consumed to produce the additional electrical power).

Certain embodiments of the present disclosure provide a scalable distributed carpet display system for use within a vehicle, such as a commercial aircraft. The carpet display system includes a plurality of light-emissive (e.g., luminous) composite floor panels and a light transmissive carpet disposed on top of the composite floor panels. The composite floor panels and light transmissive carpet may provide or represent a floor zone within an interior cabin of the vehicle, such as an aisle or an entryway within the cabin. The composite floor panels are configured to provide lighting effects on the light transmissive carpet above that are visible to individuals (e.g., vehicle passengers or staff) in the cabin. The lighting effects may include illumination through visible light (the color of which may be varied, as desired), and content, such as graphics, text, video, or the like. The lighting effects may be customized, adapted, changed, or the like.

In at least one embodiment, the carpet display system includes luminous composite floor panels that each have a cover sheet, a base sheet, a core layer, and a plurality of light sources. The core layer is disposed between the cover sheet and the base sheet, and includes a plurality of honeycomb cells bonded to one another. The light sources are disposed between a user-facing side of the cover sheet and the core layer. The light sources may be light emitting diodes (LEDs), such as organic light-emitting diodes (OLEDs) or LEDs made from inorganic semiconductor materials. The light sources are configured to emit light through the cover sheet to provide lighting effects above the user-facing side of the cover sheet. When the light transmissive carpet of the carpet display system is applied on the user-facing side of the cover sheet, the lighting effects are visible above the light transmissive carpet.

In at least one embodiment, the luminous composite floor panels represent the floor of an interior passenger cabin within the vehicle. For example, individuals may walk on the light transmissive carpet that is on the user-facing side of the cover sheet. The luminous floor panels may be suspended above a cargo hold or bay of the vehicle. For example, the cargo hold may be below the base sheet of each of the floor panels. The luminous floor panels may be interconnected. The light sources in the floor panels are protected from structural loading by the cover sheet, which may be formed of a rigid material, such as carbon fiber, graphite, fiberglass, or the like. In one or more embodiments, the light sources for the carpet display system are therefore integrated within the floor panels of the vehicle. Optionally, the light transmissive carpet installed above the floor panels does not include light sources or other electrical elements (e.g., wires, connectors, etc.).

Certain embodiments of the present disclosure provide a light transmissive (e.g., light permeable) carpet of the carpet display system that is configured to be overlaid on the luminous composite floor panels in the cabin. The light transmissive carpet includes a pile having strands of a light transmissive yarn. The light transmissive yarn includes a fiber blend of interspersed colored fibers and unpigmented fibers. The unpigmented fibers in the light transmissive yarn are translucent and transmit light therethrough. The carpet further includes a backing structure on a back side of the pile that secures the strands in place. Since the unpigmented fibers in the yarn are translucent, light emitted from the luminous composite floor panels that impinges upon the back side of the pile can be transmitted through the unpigmented fibers. Therefore, the pile is at least partially translucent, and able to transmit light. The light transmissive carpet differs from some known luminous carpets in which the pile is opaque and light is conveyed through gaps between adjacent strands or tufts of the pile, and not through the fibers of the strands or tufts. The backing structure of the light transmissive carpet may be light permeable, such as by forming a translucent backing structure or defining holes through the backing structure.

Although the carpet display system in the embodiments described herein includes both the light transmissive carpet and the luminous composite floor panels, the light transmissive carpet may be a separate and discrete product from the composite floor panels. The carpet and the floor panels may be installed at different times into the vehicle. For example, the luminous composite floor panels may be installed into an interior cabin of a vehicle, and the light transmissive carpet may be subsequently installed on top of the composite floor panels. Furthermore, the luminous composite floor panels described herein are not limited to being used exclusively with the light transmissive carpet, but rather other types of carpet, light transmissive and non-light transmissive, may be installed on the composite floor panels. Conversely, the light transmissive carpet described herein is not limited to being used exclusively with the luminous composite floor panels, but rather the light transmissive carpet may be installed on other types of floor panels. For example, the light transmissive carpet in one alternative embodiment may be installed on a conventional, non-luminous vehicle floor, and the light transmissive carpet may include light sources integrated into the backing structure of the carpet.

Embodiments of the present disclosure provide carpet display systems and methods that allow for improved branding onboard a passenger vehicle, such as an aircraft. For example, the carpet display systems can display logos, slogans, and advertisements that are viewable to passengers on the vehicle. Further, the carpet display systems and methods improve passenger experience on a vehicle, such as through improved aesthetics, light displays, content delivery, and the like. Further, the carpet display systems and methods increase vehicle safety by providing well-lit walking surfaces that may also be used for emergency lighting. Further, the carpet display systems and methods may be used to provide information to passengers, such as wayfinding information within an interior cabin of the vehicle. For example, certain embodiments of the present disclosure provide carpet display systems and methods that allow for a continuous display on a carpet, which is especially useful for wayfinding, as individuals are able to follow the display over an entire wayfinding path. The wayfinding could be implemented by displaying arrows that direct passengers to specific locations, such as designated seat rows, designated exit locations, or the like. The carpet display systems can be used to provide other information to passengers besides wayfinding, such as status information, for example fasten seat-belt indications, vehicle location information, anticipated time of arrival information, current weather information, or the like. The carpet display systems provide relatively lightweight, low cost features onboard a vehicle, and increases durability of vehicle touch surfaces.

FIG. 1 illustrates a front perspective view of an aircraft 10 (or aircraft assembly) according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an interior cabin, which may include a cockpit, one or more work sections (for example, galleys, personnel carry-on baggage areas, and the like), one or more passenger sections (for example, first class, business class, and coach sections), and an aft section. Each of the sections may be separated by a cabin transition area, which may include one or more class divider assemblies. Overhead stowage bin assemblies may be positioned throughout the interior cabin.

The interior cabin of the aircraft 10 includes a carpet display system, which is incorporated into a floor within the aircraft. The carpet display system is configured to provide light-based effects on a carpet within the aircraft 10 that individuals may walk on. The light-based or lighting effects may be visual light of any color, graphics, video, and the like transmitted onto the carpet.

Alternatively, instead of an aircraft, embodiments may be used with various other vehicles, such as automobiles, buses, locomotives and train cars, seacraft, spacecraft, and the like.

FIG. 2A illustrates a top plan view of an interior cabin 30 of an aircraft according to an embodiment of the present disclosure. The interior cabin 30 is within the fuselage 18 of the aircraft 10 (shown in FIG. 1). For example, one or more fuselage wall members may define the interior cabin 30. The interior cabin 30 includes multiple sections or zones, including a front section 33, a first class section 34, a business class section 36, a front galley station 38, a business section 40 (e.g., an expanded economy or coach section), a standard economy or coach section 42, and an aft section 44, which may include multiple lavatories and galley stations. It is to be understood that the interior cabin 30 may include more or less sections and zones than shown. For example, the interior cabin 30 may not include a first class section, and may include more or less galley stations than shown. Each of the sections may be separated by a cabin transition area 46, which may include class divider assemblies between aisles 48.

As shown in FIG. 2A, the interior cabin 30 includes two aisles 50 and 52 that lead to the aft section 44. Optionally, the interior cabin 30 may have less or more aisles than shown. For example, the interior cabin 30 may include a single aisle that extends through the center of the interior cabin 30 that leads to the aft section 44.

The interior cabin 30 includes rows 53 of seats that span across the interior cabin 30 and generally extend across the aisles 50 and 52. Columns 55, 57, and 59 of seat sections extend perpendicular to the rows 53. Each seat section may include one or more seats. The columns 55, 57, and 59 generally run parallel with the aisles 50 and 52. A particular section or zone may include any number of columns 55, 57, and 59 of seat sections. As shown in FIG. 2A, at least one zone includes three columns 55, 57, and 59 of seat sections. However, each zone may include more or less than three columns. For example, a first class section or zone may include two columns of seat sections.

The interior cabin 30 includes a carpet display system along the floor. The carpet display system includes a plurality of luminous composite floor panels and a light transmissive carpet installed on the luminous composite floor panels. Optionally, the light transmissive carpet may be formed into tiles, which may or may not have a size and shape that corresponds to the size of the floor panels. Each composite floor panel includes a core layer sandwiched between a cover sheet and a base sheet, and a plurality of light sources. The core layer has a plurality of honeycomb cells bonded together. The light sources are disposed between a top or user-facing side of the cover sheet and the core layer. For example, the light sources may be mounted directly to an underside of the cover sheet, or may be located within a discrete illumination layer that is between the cover sheet and the core layer. The light transmissive carpet includes a pile including light transmissive yarn. The light transmissive yarn includes a fiber blend of interspersed colored fibers and unpigmented, translucent fibers. The unpigmented fibers can transmit absorbed light rays through the fibers to allow for the light emitted from the luminous composite floor panels underneath the carpet to be visible along a top surface of the carpet pile.

The interior cabin may also include one or more electrical signal distribution systems 200 secured to one or more structural components within the interior cabin 30. As shown, each electrical signal distribution system 200 may run parallel with a longitudinal axis 47 of the interior cabin 30. Optionally, the electrical signal distribution systems 200 may not be parallel to the longitudinal axis 47. For example, at least one electrical signal distribution system 200 may span across the interior cabin 30 such that it is perpendicular to the longitudinal axis 47. The interior cabin 30 may include more or less electrical distribution systems 200 than shown. For example, an electrical distribution system 200 may be positioned over each longitudinal section of seats onboard an aircraft.

The electrical signal distribution systems 200 may span from a fore or front section 33 to the aft section 44. The electrical signal distribution systems 200 may span an entire length of the interior cabin 30. Optionally, the electrical signal distribution systems 200 may span less than an entire length of the interior cabin 30.

The electrical signal distribution systems 200 may be secured to various structural components within the interior cabin 30. For example, the electrical signal distribution systems 200 may be securely mounted to strongbacks, passenger service unit (PSU) troughs, stowbins, PSU rails, floor member structure, ceiling structure, wall member structure, and/or the like. The electrical signal distribution systems 200 are configured to provide electrical signals, such as power signals and/or data signals, to various electrical devices within the interior cabin, as described below.

The electrical signal distribution systems 200 are further described in U.S. patent application Ser. No. 15/287,949, entitled "Systems and Methods for Providing Electrical Signals to Electrical Devices Within An Interior Cabin of a Vehicle," filed Oct. 7, 2016, and which is hereby incorporated by reference in its entirety.

FIG. 2B illustrates a top plan view of an interior cabin 80 of an aircraft according to another embodiment of the present disclosure. The interior cabin 80 may be within the fuselage 18 of the aircraft 10 (shown in FIG. 1). For example, one or more fuselage wall members may define the interior cabin 80. The interior cabin 80 includes multiple sections or zones, including a main cabin 82 having passenger seats 83, and an aft section 85 behind the main cabin 82. It is to be understood that the interior cabin 80 may include more or less sections or zones than shown.

The interior cabin 80 may include a single aisle 84 that leads to the aft section 85. The single aisle 84 may extend through the center of the interior cabin 80 that leads to the aft section 85. For example, the single aisle 84 may be coaxially aligned with a central longitudinal plane 86 of the interior cabin 80. The interior cabin 80 may include a carpet display system and one or more electrical signal distribution systems. The one or more electrical signal distribution systems 200 are secured to structural components within the interior cabin 80.

Figure 3:
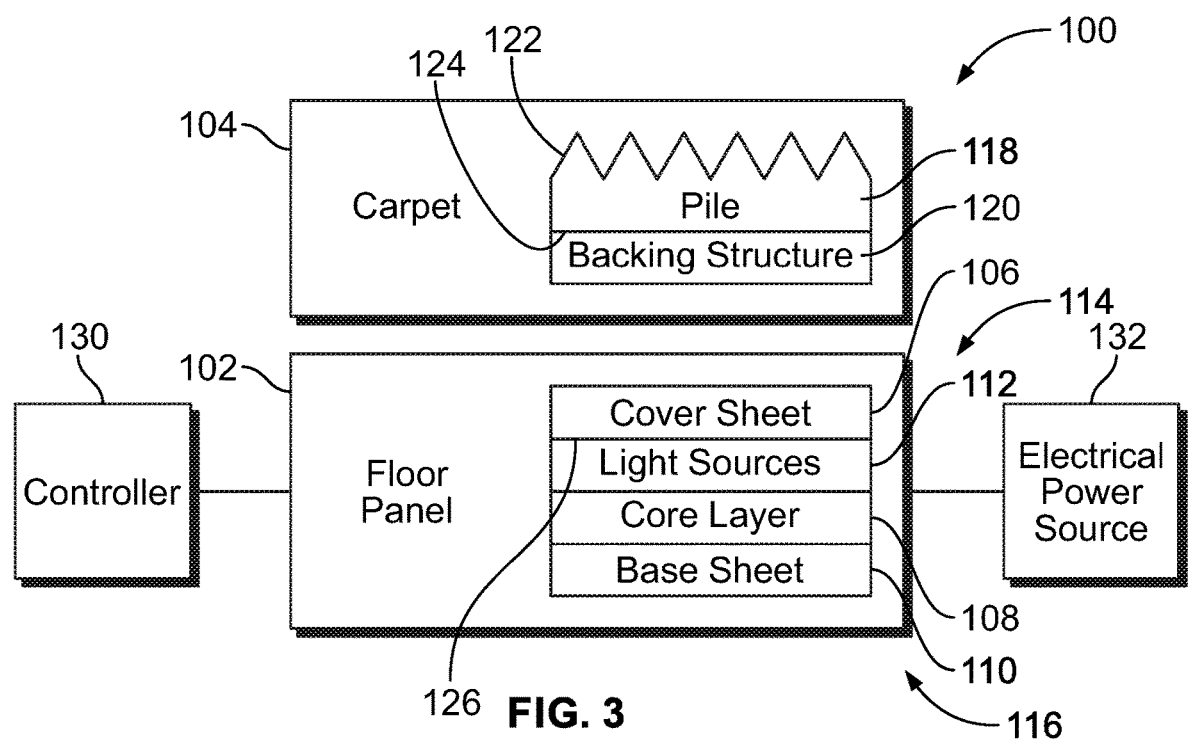
FIG. 3 illustrates a schematic block diagram of a carpet display system according to an embodiment of the present disclosure.

FIG. 3 illustrates a schematic block diagram of a carpet display system 100 according to an embodiment of the present disclosure. The carpet display system 100 includes at least one luminous composite floor panel 102 and a light transmissive carpet 104 within an interior cabin of a vehicle, such as an aircraft. Although only one floor panel 102 is shown in FIG. 3, the carpet display system 100 may include multiple floor panels that have sizes, shapes, and constructions that are identical to, or at least similar to, the floor panel 102. For example, the floor panels 102 may be replicated to produce multiple floor panels. The multiple floor panels are electrically and/or mechanically connectable to one another, such as to extend along an aisle of the vehicle.

The luminous composite floor panel 102 (referred to herein as floor panel 102) includes a cover sheet 106, a core layer 108, a base sheet 110, and a plurality of light sources 112. The cover sheet 106, core layer 108, base sheet 110, and light sources 112 are arranged in a stack to define the floor panel 102. The cover sheet 106 represents a top 114 of the floor panel 102, and the base sheet 110 represents a bottom 116 of the floor panel 102. The core layer 108 and the light sources 112 are disposed between the cover sheet 106 and the base sheet 110. The core layer 108 may be bonded to the cover sheet 106 and the base sheet 110 to define a lightweight support structure or base that supports the passengers, seats, equipment, and the like that are located within the passenger interior cabin. The light sources 112 are located above the core layer 108 and below at least a portion of the cover sheet 106. The light sources 112 are configured to generate light that penetrates the cover sheet 106 and is visible above the floor panel 102, as described below in more detail. For example, the cover sheet 106 may be transparent, or at least translucent, or formed with multiple holes that align with the light sources 112, thereby allowing light emitted by the light sources 112 to pass therethrough. The light sources 112 may include one or more LEDs, OLEDs, or the like. The light sources 112 may be arranged in an array to provide a display or monitor beneath the light transmissive carpet 104. For example, the light sources 112 may be arranged to provide a high definition or ultra-high definition display. Even though the light transmissive carpet 104 (or other light transmissive carpets) may, to an extent, provide some distortion, the visual effects are still discernable and continuous.

In at least one embodiment, the light transmissive carpet 104 is installed on the top 114 of the floor panel 102, such as directly on the cover sheet 106. The light transmissive carpet 104 (referred to herein as carpet 104) includes a pile 118 and a backing structure 120. The pile 118 has a user-facing side 122 and a back side 124 that is opposite from the user-facing side 122. The backing structure 120 extends along the back side 124 of the pile 118. The backing structure 120 is between the pile 118 and the floor panel 102. The backing structure 120 is light permeable to allow light emitted from the floor panel 102 through the backing structure 120 to the pile 118. For example, the backing structure 120 may be transparent, or at least translucent. Alternatively, the backing structure 120 may be opaque, but defines an array of holes therethrough. Light received within the holes passes through the backing structure 120 to the pile 118. In the illustrated embodiment, the carpet 104 lacks light sources and other electrical elements that could be damaged from dropped luggage, shoes (e.g., pointed heeled shoes), or the like. But, in an alternative embodiment, the carpet 104 may include one or more integrated light sources within, or mounted to, the backing structure 120.

The pile 118 includes strands of a light transmissive yarn, which may be tufted, woven, or the like. The light transmissive yarn includes a fiber blend of both colored fibers and unpigmented fibers. For example, the unpigmented fibers represent a certain percentage of the totality of fibers in the light transmissive yarn, and the colored fibers represent a remainder of the fibers in the yarn. The unpigmented fibers are transparent, or at least translucent, and can transmit light through the fibers (e.g., via total internal reflection) and emit the light towards the passengers in the cabin. The colored fibers may be opaque, or at least have a reduced visible light transmittance compared to the unpigmented fibers. Due to the unpigmented fibers in the yarn, the pile 118 is at least partially translucent, such that some of the light underneath the carpet 104 is transmitted across the pile 118 within individual unpigmented fibers. The illuminated unpigmented fibers provide at least some of the light that is visible to the people in the cabin. Additional visible light may be transmitted between adjacent tufts, loops, or strands of the pile 118. Thus, some of the light emitted from the floor panel 102 that impinges upon the carpet 104 may be transmitted across the pile 118 within individual unpigmented fibers in the light transmissive yarn, and other light may be transmitted across the pile 118 through air gaps between strands, tufts, or loops of the pile 118.

Optionally, the carpet 104 may include a pattern and/or insignia, such as one or more logos or other such graphics. The light sources 112 in the floor panel 102 may be configured to accentuate the pattern and/or insignia of the carpet 104, such as a backlighting effect in which flames, rays, or the like appear to be emanating from a logo.

The carpet 104 may be secured to the cover sheet 106 of the floor panel 102 via an adhesive, fasteners, and/or the like. In an embodiment, the adhesive is transparent, or at least translucent, to reduce attenuation and distortion of the light emitted across the interface between the floor panel 102 and the carpet 104.

As described above, the floor panel 102 may represent a portion of the floor of the interior cabin of the aircraft 10 (shown in FIG. 1). The floor panel 102 may be suspended across a cargo hold or bay, such that the base sheet 110 at the bottom 116 of the floor panel 102 may represent a ceiling of the cargo hold. A plurality of the floor panels, such as floor panel 102, and the carpet 104 may provide a floor section within a zone (such as a first, business or economy class zone) within the interior cabin 30 (shown in FIG. 2A) of the aircraft 10.

A controller 130 is associated with the floor panel 102. In particular, the controller 130 is in communication with the light sources 112, such as through one or more wired or wireless connections, and is configured to control operation of the light sources 112. In operation, the controller 130 controls the light sources 112 to emit light to provide a desired lighting effect onto the light transmissive carpet 104. The light emitted from the light sources 112 passes through the cover sheet 106 of the floor panel 102 and the backing structure 120 of the carpet 104 onto the pile 118, thereby providing a lighting effect that is viewable by individuals within the interior cabin of the vehicle.

In at least one embodiment, the controller 130 is remote from the floor panel 102, and is configured to wirelessly communicate with the light sources 112. For example, the controller 130 may be secured to various other structures (such as a ceiling, strongback, monument, or the like) within the interior cabin of the aircraft 10. In at least one other embodiment, the controller 130 is incorporated within the floor panel 102, such as on a circuit board disposed between the cover sheet 106 and the core layer 108 or mounted directly onto an underside 126 of the cover sheet 106 that faces the core layer 108. The controller 130 optionally may be associated with a plurality of the floor panels 102. Thus, the controller 130 may be mechanically mounted to one floor panel 102, and configured to control the light sources 112 of multiple floor panels such as floor panel 102 (including other floor panels remote from the controller 130).

The controller 130 is and/or includes one or more processors that are configured to control operations of the light sources 112, such as to control the timing, color, and intensity of the lighting effects emitted from the light sources 112. The controller 130 may control the operations of the light sources 112 based on designated sets of instructions. The controller 130 may be a microcontroller. The carpet display system 100 may include multiple controllers 130 that are configured to control the light sources 112 of different floor panels 102.

The controller 130 is configured to execute a set of instructions stored in one or more data storage units or elements (such as one or more memories included within or connected to the controller 130). The data storage units may also store data or other information as desired or needed. The data storage units may be in the form of an information source or a physical memory element within a processing machine.

The set of instructions may include various commands that instruct the controller 130 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The floor panel 102 is electrically connected to an electrical power source 132. For example, each floor panel 102 may include at least one electrical plug connector that couples to a mating electrical connector or a power outlet within the interior cabin. In at least one embodiment, a first floor panel 102 is directly connected to a power outlet in the interior cabin, and other floor panels are connected directly or indirectly to that first floor panel 102 (such as through a daisy chain). Thus, the electrical power source 132 that supplies electrical power to the first floor panel 102 is the outlet, and the electrical power sources 132 that supply electrical power to the other floor panels may be other floor panels in the daisy chain. The outlet within the interior cabin may be an outlet of the electrical signal distribution system 200 (shown in FIGS. 2A and 2B). The electrical plug connector of the floor panel 102 may be configured to provide both electrical power and electrical data signals (e.g., control signals) to the light sources 112. Thus, electrical power from the electrical power source 132 and data from the remote controller 130 may be conveyed via the electrical connector and a wired connection to the light sources 112. In an alternative embodiment, a wireless network connection is configured to provide at least one of the data signals and/or the electrical power wirelessly to the light sources 112, without the use of a wired connection.

Figure 4:
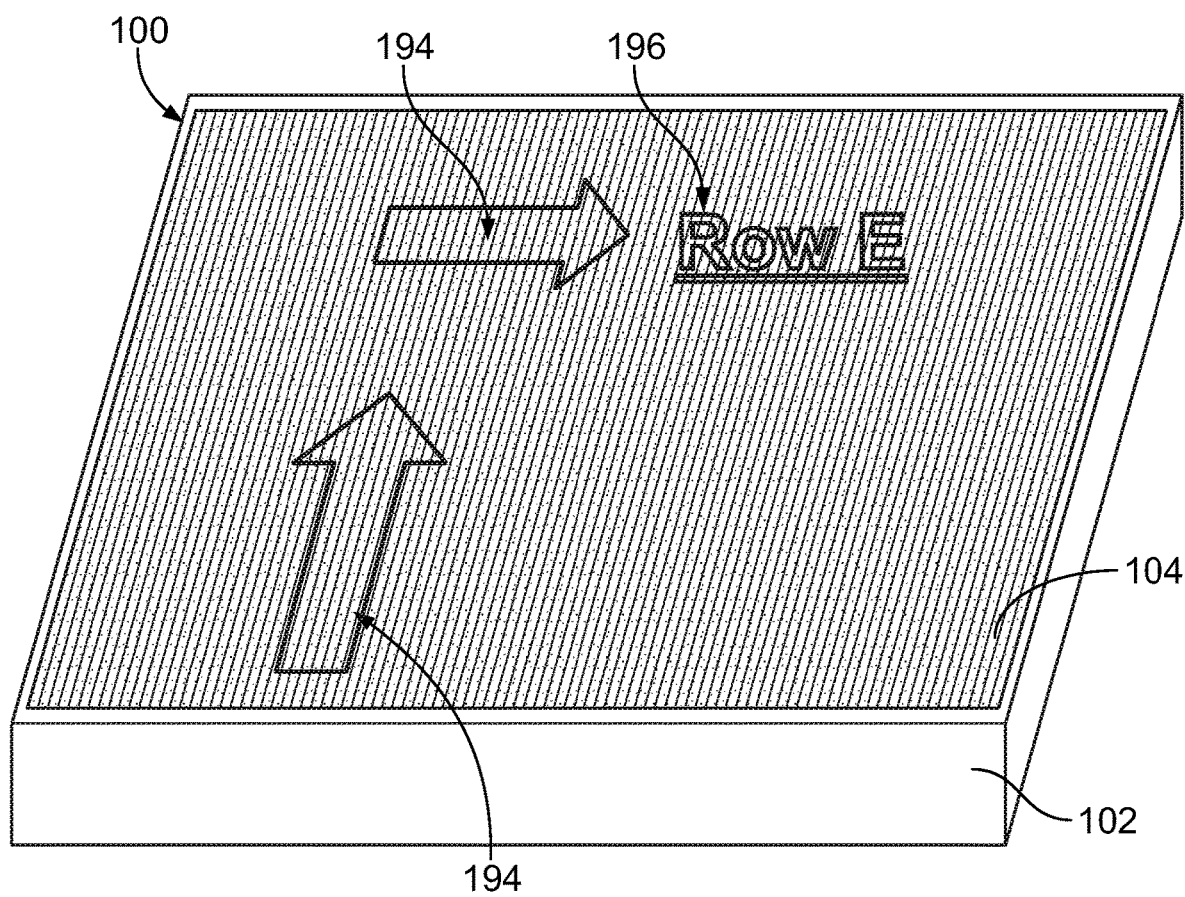
FIG. 4 is a top perspective view of the carpet display system in an assembled state showing a light transmissive carpet on a luminous composite floor panel according to an embodiment.

FIG. 4 is a top perspective view of the carpet display system 100 in an assembled state showing the light transmissive carpet 104 on the composite floor panel 102 according to an embodiment. As described above, the carpet display system 100 is configured to provide lighting effects onto the carpet 104 that are viewable by individuals proximate to the carpet display system 100, such as people walking on or near the carpet display system 100 or looking down at the carpet display system 100 from a vantage point above the carpet display system 100. The lighting effects can be used for advertising, pure aesthetics, wayfinding, or to provide other information. The lighting effects may include various static and/or dynamic insignia produced by the light sources 112 (shown in FIG. 3) of the composite floor panel 102. In certain embodiments, the insignia includes multiple arrows 194 and a row marker 196. The row marker 196 indicates "Row E." The arrows 194 and the row marker 196 in the illustrated embodiment provide wayfinding to a passenger of the vehicle. For example, the passenger may have a ticket for a seat in the row marked "E," and the arrows 194 and row marker 196 are provided to lead the passenger to the correct row in the vehicle. It is recognized that the arrows 194 and the row marker 196 are not permanent insignia in the carpet 104, but rather are lighting effects produced by the light sources 112 of the floor panel 102 underneath the carpet 104. The arrows 194 may be static or dynamic, such that the arrows 194 may be configured to move relative to the carpet 104. For other passengers with seats in other rows, the carpet display system 100 may be configured to modify the positions and locations of arrows, and the positions and text of row markers to direct those passengers to their associated seats. In other embodiments, the carpet display system 100 may provide wayfinding by using different insignia, such as showing a path of foot prints in the carpet 104 or the like.

Figure 5:
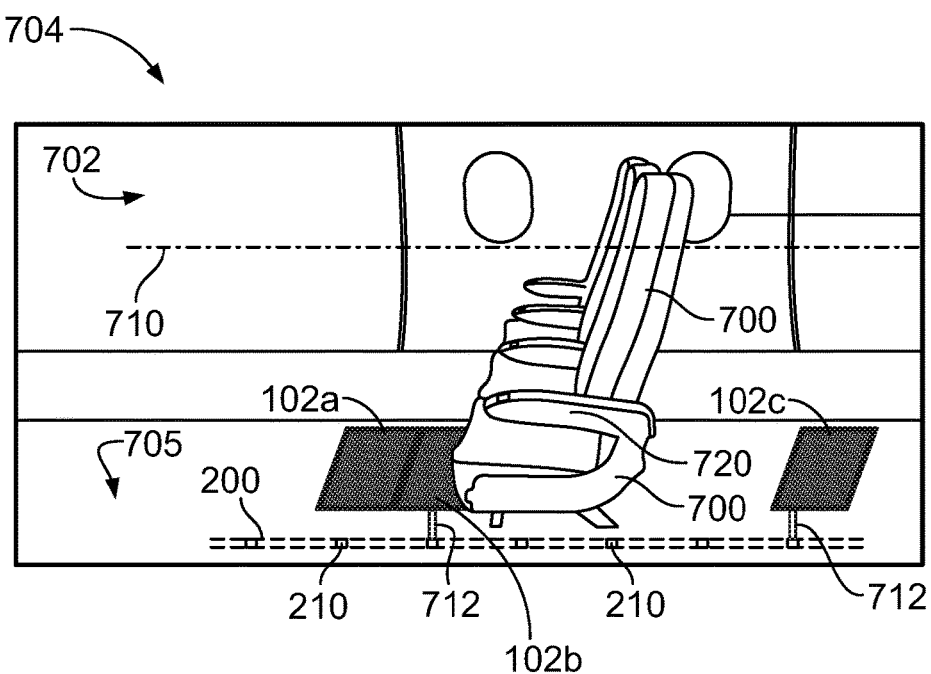
FIG. 5 illustrates a lateral perspective view of a row of seats within an interior cabin of a vehicle according to an embodiment of the present disclosure.

FIG. 5 illustrates a lateral perspective view of a row of seats 700 within an interior cabin 702 of a vehicle 704 according to an embodiment of the present disclosure. The interior cabin 702 may include an electrical signal distribution system 200 mounted to a floor 705 of the interior cabin 702. As shown, the electrical signal distribution system 200 extends along a length of the interior cabin 702. The electrical signal distribution system 200 may extend generally parallel with a central longitudinal axis 710 of the interior cabin 702, or at least a portion thereof. Optionally one or more electrical signal distribution systems may be oriented transverse to the central longitudinal axis 710.

The electrical signal distribution system 200 includes multiple outlets 210 spaced apart along the length of the electrical distribution system 200. The electrical signal distribution systems 200 replace wiring and bundles traditionally used to connect electrical devices to power and data sources. The regularly-spaced outlets 210 on the electrical signal distribution system 200 allow for quick and easy connection to various electrical devices throughout the interior cabin 702.

The floor panel 102 may be coupled to an outlet 210 of the electrical signal distribution system 200. For example, the controller 130 (shown in FIG. 3) associated with the floor panel 102 may receive data and power signals, via a wired connection 712 with the electrical signal distribution system 200. In the illustrated embodiment, three floor panels 102a, 102b, 103c are electrically connected to the electrical signal distribution system 200. The floor panels 102b and 102c are each directly connected to a corresponding outlet 210 of the electrical signal distribution system 200. The floor panel 102a is adjacent to the floor panel 102b. The floor panel 102a is directly connected to the floor panel 102b and indirectly connected to the electrical signal distribution system 200 via the floor panel 102b. The floor panels 102a and 102b form a daisy chain. The floor panel 102a receives power and data signals from the floor panel 102b, without connecting directly to an outlet 210. In certain embodiments, additional floor panels may be connected to the floor panels 102a, 102b in the daisy chain. Furthermore, one or more floor panels may be connected to the floor panel 102c, without connecting directly to an outlet 210, to define another daisy chain.

Although not shown in FIG. 5, the light transmissive carpet 104 (shown in FIG. 3) can be overlaid on top of the luminous composite floor panels 102 to define the carpet display system 100 (FIG. 3) for presenting customized lighting effects to passengers in the interior cabin 702.

Figure 6:
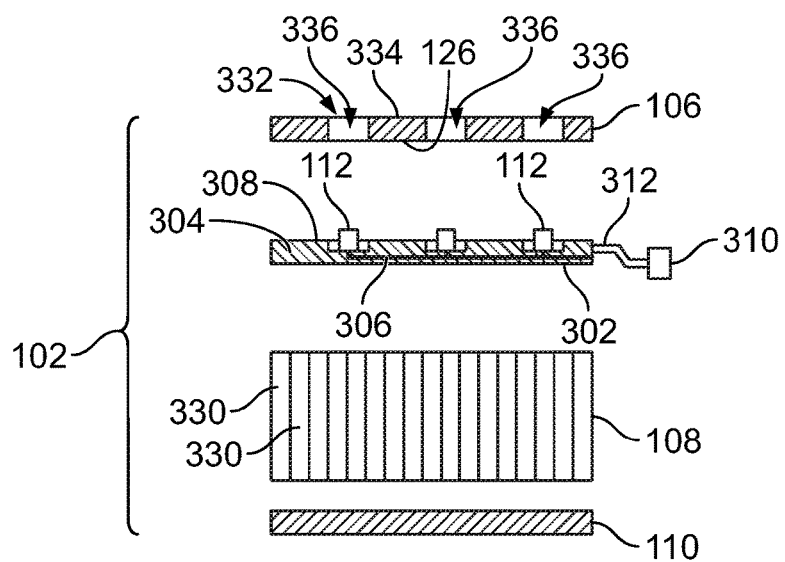
FIG. 6 is an exploded cross-sectional view of a luminous composite floor panel of the carpet display system according to an embodiment of the present disclosure.

FIG. 6 is an exploded cross-sectional view of the luminous composite floor panel 102 according to an embodiment. The layers of the composite floor panel 102 are shown spaced apart vertically from one another for descriptive purposes. The light sources 112 in the illustrated embodiment are located on an illumination layer 302 that is between the cover sheet 106 and the core layer 108. The illumination layer 302 includes one or more substrates 304 on which the light sources 112 are mounted. The illumination layer 302 may include or represent one or more circuit boards or strips. Each substrate 304 may be rigid or flexible. For example, the illumination layer 302 may represent one or more rigid circuit boards or one or more flex circuit strips. The substrate 304 further includes conductive elements 306, such as electrical traces, wires, switches, and the like, that are mounted on, embedded in, or encased within the substrate 304. The conductive elements 306 provide electrical power (e.g., electric current) to the light sources 112). The light sources 112 are mounted and/or embedded on an upper surface 308 of the substrate 304, and optionally may protrude beyond the upper surface 308. As described above, the light sources 112 may be LEDs or OLEDs. Although not shown, the illumination layer 302 may include one or more additional components, such as capacitors, resistors, transistors, processors (e.g., the controller 130 shown in FIG. 3), heat sinks, and the like, that are mounted to the substrate 304.

Optionally, the illumination layer 302 includes an incorporated electrical edge connector 310 that extends from the substrate 304. The edge connector 310 is electrically connected to the conductive elements 306 via a cable or wire 312, and is used to releasably electrically connect the floor panel 102 with the electrical power source 132 (shown in FIG. 3). The electrical power source 132 for the illustrated floor panel 102 may be another floor panel 102, the electrical signal distribution system 200 (shown in FIG. 5), or another power source.

Figure 7:
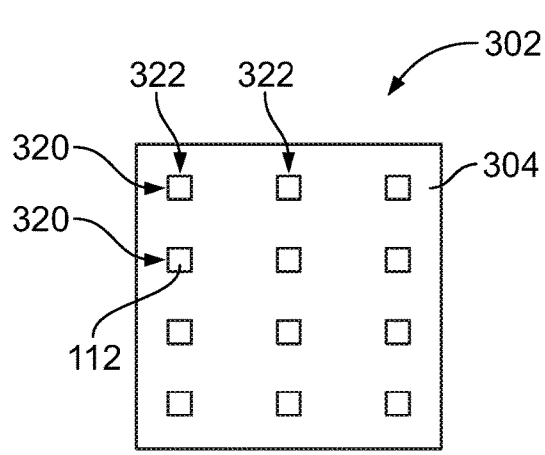
FIG. 7 is a top-down view of an illumination layer of the luminous composite floor panel according to an embodiment of the present disclosure.

FIG. 7 is a top-down view of the illumination layer 302 according to one embodiment. The illumination layer 302 in the illustrated embodiment includes a single rectangular substrate 304, and the light sources 112 are arranged in a matrix pattern or array on the substrate 304. For example, the light sources 112 are spaced apart from one another and arranged in columns 320 and rows 322. The controller 130 (shown in FIG. 3) may be configured to control the operation of the light sources 112 individually to provide the designated lighting effects, such as to spell words, display logos, and provide dynamic graphics (e.g., moving arrows and the like).

Figure 8:
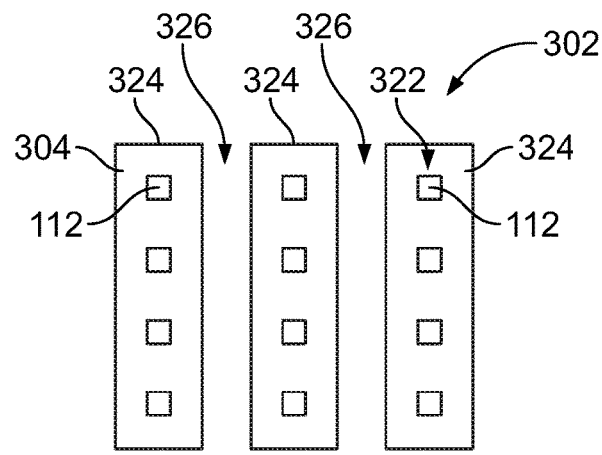
FIG. 8 is a top-down view of the illumination layer according to another embodiment of the present disclosure.

FIG. 8 is a top-down view of the illumination layer 302 according to another embodiment. The illumination layer 302 in the illustrated embodiment includes multiple strips 324 of substrates 304 spaced apart from one another and arranged in parallel to each other. In the spaces 326 between the strips 324, the core layer 108 may engage the cover sheet 106 directly when the floor panel 102 is assembled. Each strip 324 includes multiple light sources 112 arranged in a single row 322, but the light sources 112 may be arranged in multiple rows 322 on each strip 324 in another embodiment. The light sources 112 on each strip 324 may be controlled by a different corresponding controller 130, or alternatively, by a single master controller 130, in order to provide the designated lighting effects.

Referring now back to FIG. 6, the core layer 108 includes a plurality of honeycomb cells 330 bonded to one another. The honeycomb cells 330 are composed of a composite material, such as carbon fiber, a ceramic composite, or a metal composite. The metal composite may be titanium and aluminum. The carbon fiber material may include one or more of a meta-aramid synthetic fiber composite such as Nomex® (a registered trademark of DuPont), a para-aramid synthetic fiber composite such as Kevlar® (a registered trademark of DuPont), or the like. The honeycomb cells 330 may be held together via an adhesive. The honeycomb cells 330 are hollow and provide a core layer 108 with a high strength-to-weight ratio.

The cover sheet 106 and the base sheet 110 are composed of a composite laminate material and/or fiberglass. The composite laminate material may include one or more layers of carbon-fiber reinforced plastic (CFRP), which is referred to herein as "graphite." The graphite laminate material may include layers of titanium foil, foils of other metals, fiberglass, Nomex, Kevlar, and/or the like. In the illustrated embodiment, the cover sheet 106 and the base sheet 110 are both composed of graphite. The graphite material is opaque.

In an embodiment, the cover sheet 106 includes one or more light transmissive regions 332 that are configured to allow light through the cover sheet 106 between the underside 126 and a user-facing side 334 that is opposite from the underside 126. The one or more light transmissive regions 332 make the cover sheet 106 light permeable to allow light from the light sources 112 to penetrate the cover sheet 106 and impinge upon the light transmissive carpet 104 (shown in FIG. 3). In the illustrated embodiment, the cover sheet 106 is formed of an opaque material, and the cover sheet 106 includes multiple holes 336 therethrough that represent the light transmissive regions 332. Each hole 336 extends fully through the cover sheet 106 between the user-facing side 334 and the underside 126. In an embodiment, each of the holes 336 is aligned with an individual one of the light sources 112 on the illumination layer 302 when the floor panel 102 is assembled. For example, each light source 112 optionally may extend at least partially into the corresponding hole 336 when the illumination layer 302 is bonded to the underside 126 of the cover sheet 106. The light emitted from a corresponding light source 112 travels through the corresponding hole 336 across the thickness of the cover sheet 106 to provide the lighting effects on the carpet 104 above the floor panel 102. In other embodiments, other arrangements are possible. For example, the light transmissive regions 332 may comprise a uniform sheet void of the holes 336.

In an alternative embodiment, the cover sheet 106 is translucent, such that an entire area of the cover sheet 106 defines a light transmissive region that allows light through the cover sheet 106. For example, the cover sheet 106 may be composed of fiberglass or another translucent composite material. The translucent cover sheet 106 may be a uniform sheet, void of the holes 336 shown in FIG. 6.

Figure 9:
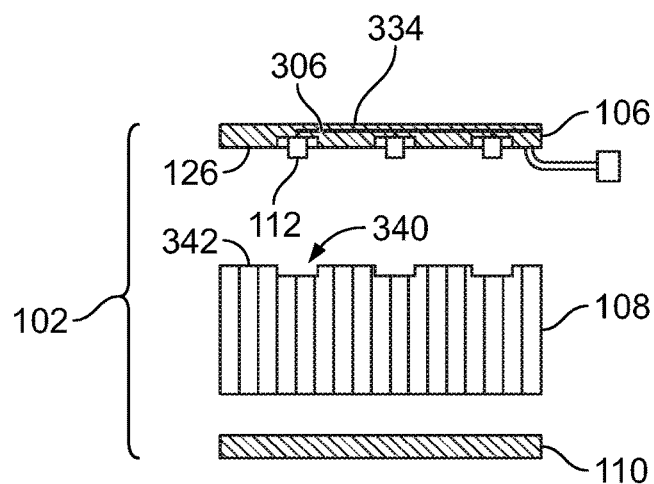
FIG. 9 is an exploded cross-sectional view of the luminous composite floor panel according to another embodiment of the present disclosure.

FIG. 9 is an exploded cross-sectional view of the luminous composite floor panel 102 according to another embodiment. The floor panel 102 in the illustrated embodiment differs from the floor panel 102 shown in FIGS. 6-8 in that the floor panel 102 in FIG. 9 does not include a discrete illumination layer that is separate from the cover sheet 106. Instead, the light sources 112 are mounted directly to the underside 126 of the cover sheet 106. The cover sheet 106 defines a substrate that supports and holds the light sources 112. The cover sheet 106 also includes the conductive elements 306 that convey electrical power and data (e.g., control signals) to the light sources 112. The conductive elements 306 are mounted to, embedded in, or encased within the cover sheet 106. Although the light sources 112 are mounted directly to the cover sheet 106, the light sources 112 are located below the user-facing side 334 of the cover sheet 106. The light sources 112 and the conductive elements 306 are spaced apart from the user-facing side 334 by an intervening portion of the cover sheet 106, which protects the light sources 112 and the conductive elements 306 from impact forces and loads, such as high-heeled shoes and dropped luggage.

In the illustrated embodiment, the light sources 112 are embedded in the cover sheet 106 along the underside 126. The core layer 108 may include notches 340, or cut-out sections, along a top side 342 thereof. The notches 340 align with the light sources 112 and are configured to receive the light sources 112 therein when the core layer 108 is bonded to the underside 126 of the cover sheet 106. The light sources 112 in an alternative embodiment may be fully enclosed or encased within the thickness of the cover sheet 106. In such an alternative embodiment, the underside 126 of the cover sheet 106 and the top side 342 of the core layer 108 may both be planar (e.g., the core layer 108 lacks notches).

In the illustrated embodiment, the cover sheet 106 is transparent or at least translucent. The light sources 112 are configured to emit light into the cover sheet 106, and at least some of the light is transmitted through the cover sheet 106 and emitted from the user-facing side 334. For example, the cover sheet 106 may be formed of fiberglass or another light-transmitting material. In the illustrated embodiment, the cover sheet 106 is solid and lacks holes (e.g., does not include the holes 336 shown in FIG. 6). The base sheet 110 optionally may be formed of graphite, fiberglass, or the like.

Figure 10:
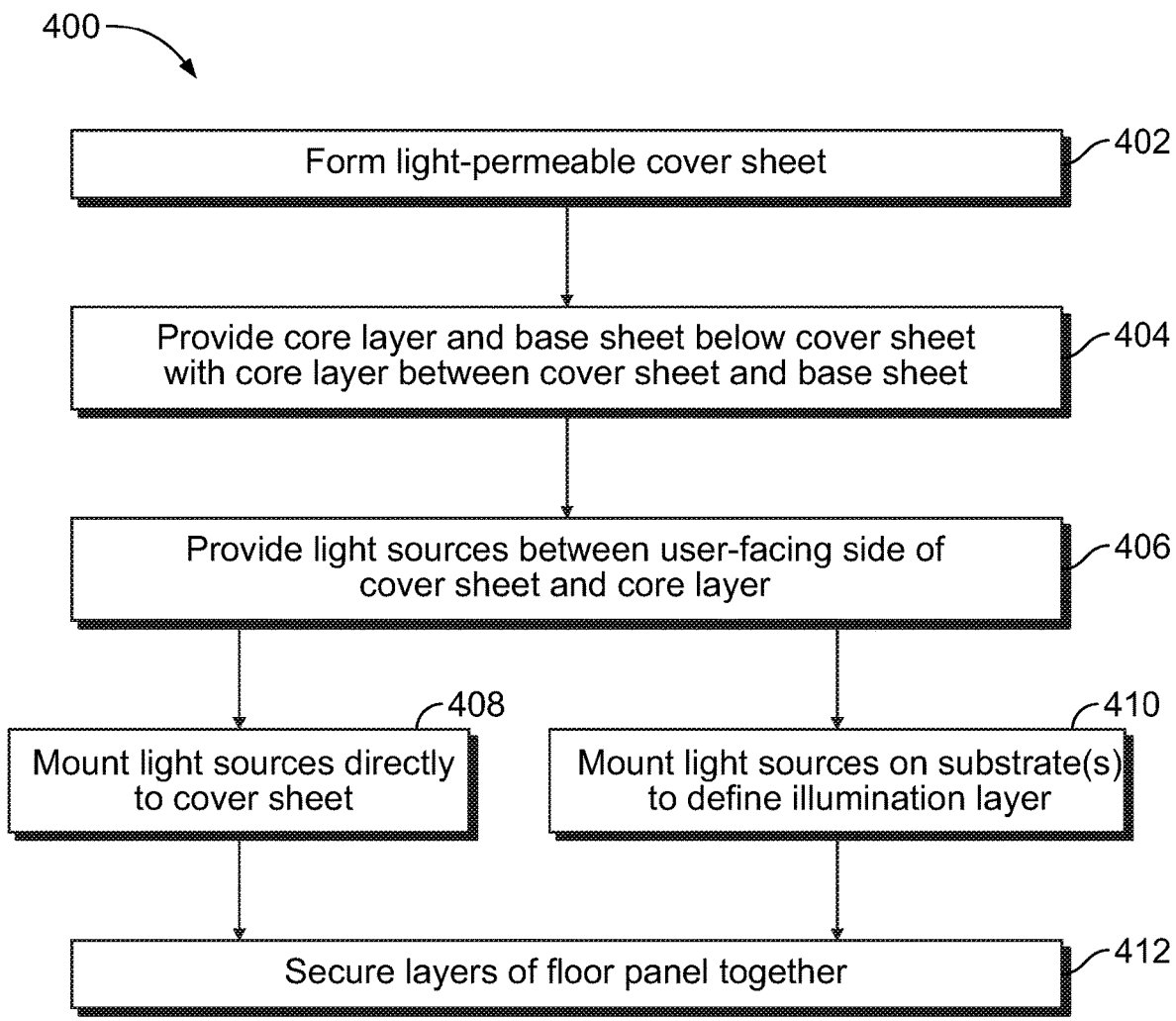
FIG. 10 is a flow chart of a method of producing a luminous composite floor panel for an interior cabin of a vehicle according to an embodiment of the present disclosure.

FIG. 10 is a flow chart of a method 400 of producing a luminous composite floor panel according to an embodiment. The luminous composite floor panel produced by the method 400 may be installed within an interior cabin of a vehicle. The method 400 may produce one or more of the embodiments of the luminous composite floor panel 102 shown in FIGS. 3-9. At 402, a light permeable cover sheet is formed, such that light is allowed to through cover sheet. The cover sheet has a thickness that extends between a user-facing side and an underside that is opposite from the user-facing side. The cover sheet may be formed of a transparent, or at least translucent material, so light can be refracted into the cover sheet at the underside and at least some of the light is emitted from the user-facing side. The transparent or translucent material may be fiberglass or the like. Alternatively, the cover sheet may be composed of an opaque material, such as graphite. The opaque material absorbs light without transmitting the light, so the cover sheet is made light permeable by forming holes in the cover sheet that extend through the thickness of the cover sheet between the user-facing side and the underside. The holes may be filled by air or a translucent solid material, such that light can be transmitted across the cover sheet through the holes.

At 404, a core layer and a base sheet are provided below the underside of the cover sheet. The core layer is disposed between the cover sheet and the base sheet. The base sheet is a rigid panel that may be formed of graphite, fiberglass, a metal, or another type polymer composite material. In one embodiment, the base sheet is formed of graphite. The core layer includes a plurality of honeycomb cells that are bonded to one another. The honeycomb cells may be hollow, or at least partially hollow, and formed of carbon fiber, glass fiber, aluminum fiber, aramid fiber, or another composite material.

At 406, light sources are provided between the user-facing side of the cover sheet and the core layer. The light sources are disposed below the user-facing side of the cover sheet and are protected from impact forces and structural loads by at least a portion of the cover sheet disposed between the light sources and the user-facing side. At 408, the light sources are mounted directly to the cover sheet. For example, the cover sheet may function as a substrate that holds the light sources and conductive elements, such as electrical traces and/or wires, which are used to convey electrical power and control signals to the light sources. The light sources may be mounted along the underside of the cover sheet that faces the honeycomb cells of the core layer. Alternatively, the light sources may be mounted within the thickness of the cover sheet between the user-facing side and the underside. In the embodiment described above in which the cover sheet is opaque and includes multiple holes therethrough, the light sources are mounted to the cover sheet to align with the holes in the cover sheet.

At 410, as an alternative to mounting the light sources directly to the cover sheet at 408, the light sources may be mounted on one or more substrates that are discrete from the cover sheet. The light sources and the one or more substrates define an illumination layer disposed between the cover sheet and the core layer. The one or more substrates may be rigid or flexible, such as a rigid printed circuit board or a flex circuit strip. The one or more substrates include conductive elements, like electrical traces and/or wires, which convey electrical power and control signals to the light sources.

At 412, regardless of whether the light sources are mounted directly to the cover sheet or directly to the one or more substrates in the discrete illumination layer, the layers of the luminous composite floor panel are secured together in the stack configuration. For example, the honeycomb cells of the core layer and the light sources are sandwiched between the cover sheet and the base sheet. The layers may be secured together via the use of adhesives. The adhesive may be transparent, or at least translucent. Optionally, after the adhesives are applied between adjacent layers, the layers are heated to cure the adhesives and bond the layers together. Once the floor panel is completed, the floor panel may be installed in an interior cabin of a vehicle, such as an aircraft or a rail vehicle.

Figures 11, 12:
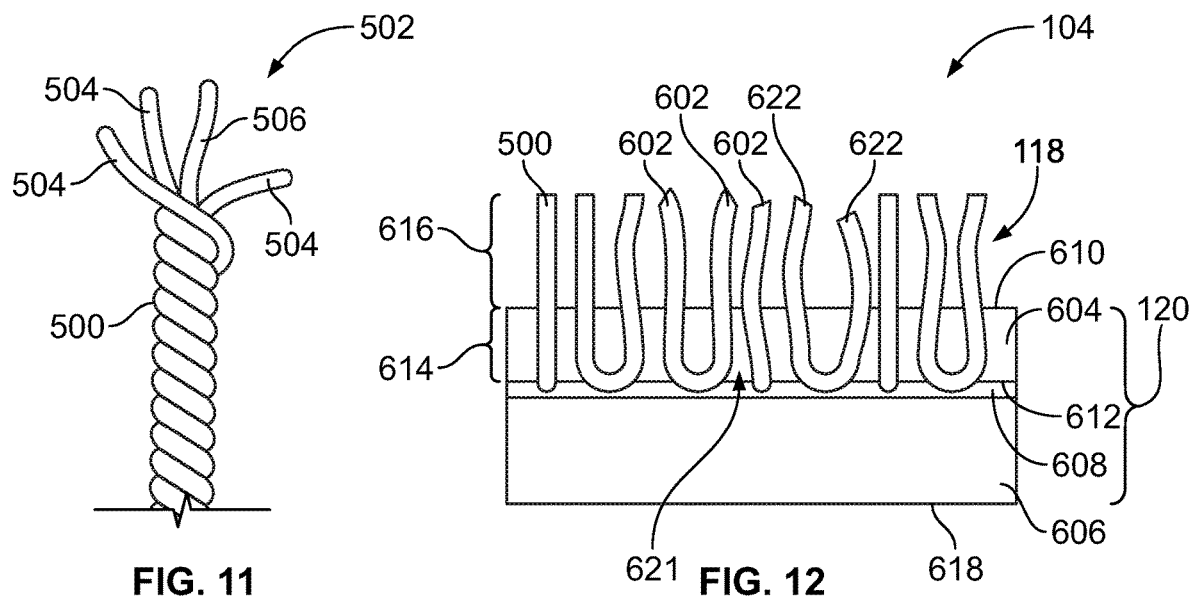
FIG. 11 illustrates a strand of light transmissive yarn of a light transmissive carpet of the carpet display system according to an embodiment of the present disclosure.
FIG. 12 is a lateral view of a close-up portion of the light transmissive carpet according to an embodiment of the present disclosure.

FIG. 11 illustrates a strand 500 of the light transmissive yarn 502 of the light transmissive carpet 104 (shown in FIG. 3) according to an embodiment of the present disclosure. The pile 118 (FIG. 3) of the light transmissive carpet 104 is made up of numerous (e.g., thousands) of strands like the strand 500. The light transmissive yarn 502 includes a fiber blend of both colored fibers 504 and unpigmented fibers 506. The colored fibers 504 have color, and are generally opaque. The colored fibers 504 may have the same or different colors as other colored fibers 504 in the carpet 104. The colored fibers 504 provide the aesthetic visible color of the carpet 104 to an observer. For example, a grey carpet 104 has colored fibers 504 of one or more shades of grey. The colored fibers 504 may be colored by exposing the fibers 504 to a colorant, such as a dye, ink, pigment, or substance. For example, wool fibers may be dyed. In another example, nylon fibers may be extruded with a pigment. Since the colored fibers 504 are opaque, the light that impinges on the colored fibers 504 is generally absorbed or reflected without the light being emitted from the colored fibers 504.

The unpigmented fibers 506 are transparent, or at least translucent, and are configured to transmit light through the fibers 506 and emit the light from the fibers 506. The unpigmented fibers 506 in one embodiment have no pigment, but the unpigmented fibers 506 alternatively may include a trace amount of pigment. For example, the unpigmented fibers 506 may have a pigmentation content of less than ten percent, which means that less than ten percent of the total surface area of each unpigmented fibers 506 is covered by a pigment, dye, ink, or other colored substance. The unpigmented fibers 506 have a greater light transmittance property than the colored fibers 504. Therefore, the unpigmented fibers 506 in the yarn 502 can transmit light through the fibers 506 (e.g., via total internal reflection) better than the colored fibers 504. Since the unpigmented fibers 506 are transparent or translucent, the unpigmented fibers 506 do not contribute to the aesthetic visible color of the light transmissive carpet 104, which is provided by the colored fibers 504. The unpigmented fibers 506 make the pile 118 of the carpet 104 at least partially translucent, such that some of the light emitted from the luminous composite floor panel 102 (or other light sources underneath the carpet 104) transmits across the pile 118 within the individual unpigmented fibers 506.

The unpigmented fibers 506 are twisted and/or woven with the colored fibers 504 to form the light transmissive yarn 502. The unpigmented fibers 506 represent a certain percentage of the totality of fibers in the fiber blend of the light transmissive yarn 502. For example, the unpigmented fibers 506 may comprise or make up approximately 5 to 50 percent of the totality of fibers in the fiber blend. Optionally, the unpigmented fibers 506 may comprise approximately 15 to 30 percent of the totality of fibers in the fiber blend. The colored fibers 504 may represent a remainder of the fibers in the yarn 502. Thus, the colored fibers 504 may comprise approximately 50 to 95 percent of the fibers in the fiber blend, such as approximately 70 to 85 percent. In the illustrated embodiment, the strand 500 includes four fibers that are twisted around one another, with one unpigmented fiber 506 and three colored fibers 504. The fiber blend in the illustrated embodiment is 25 percent unpigmented fibers 506 and 75 percent colored fibers 504. The illustrated strand 500 is merely an example, and the strands in the light transmissive carpet 104 may include more than four fibers and more or less than 25 percent unpigmented fibers in other embodiments. For example, each strand 500 may include tens, hundreds, or even thousands of individual fibers.

The fibers 504, 506 in the fiber blend may be made of synthetic polymers, such as nylon, propylene, acrylic, or polyester. Alternatively, the fibers 504, 506 may be composed of wool or cotton. In one embodiment, the unpigmented fibers 506 are composed of nylon.

FIG. 12 is a lateral view of a close-up portion of the light transmissive carpet 104 according to an embodiment of the present disclosure. The pile 118 includes many strands 500 of the light transmissive yarn 502. The strands 500 may be arranged as tufts or may be woven. The strands 500 of the pile 118 include translucent yarn strands 602 (also referred to herein as translucent strands 602). Optionally, the pile 118 may also include at least some non-translucent, opaque yarn strands 622 (also referred to herein as opaque strands 622) arranged around the translucent strands 602. The opaque strands 622 are formed of a yarn that includes colored fibers only, such that the yarn lacks translucent, unpigmented fibers. Thus, the opaque strands 622 may be conventional carpet strands that are not configured to transmit light through the fibers of the yarn. In one or more other embodiments, the carpet 104 only includes the translucent strands 602 formed of the light transmissive yarn (and does not include any opaque strands 622), although it is recognized that the translucent strands 602 include colored, opaque fibers.

The backing structure 120 of the carpet 104 in the illustrated embodiment includes a primary backing layer 604 and a secondary backing layer 606 that is mounted to the primary backing layer 604 via an adhesive 608. The secondary backing layer 606 defines a bottom surface 618 of the light transmissive carpet 104. The secondary backing layer 606 and adhesive 608 are optional, and the primary backing layer 604 may represent the entire backing structure 120 in an alternative embodiment.

The primary backing layer 604 is disposed between the pile 118 and the secondary backing layer 606. The primary backing layer 604 includes a top surface 610 and a bottom surface 612 that is opposite from the top surface 610. The translucent and opaque strands 602, 622 (e.g., collectively the strands 500) penetrate the primary backing layer 604. For example, the strands 602, 622 include fixed segments 614 that extend at least partially through the primary backing layer 604, and free segments 616 that protrude beyond the top surface 610 of the primary backing layer 604. Each free segment 616 may be cantilevered, as shown, or attached to another free segment 616 to define a closed loop or the like. In an embodiment, the fixed segments 614 of the strands 602, 622 extend fully through the primary backing layer 604 such that the strands 602, 622 engage the adhesive 608 below the bottom surface 612. The adhesive 608 secures the primary and secondary backing layers 604, 606 together, and also may secure the strands 602, 622 in place. The strands 602, 622 optionally may be woven into the primary backing layer 604.

The backing structure 120 is at least partially light permeable to allow light that impinges on the bottom surface 618 to penetrate the backing structure 120 and reach the strands 602, 622 in the pile 118. For example, the secondary backing layer 606 and the adhesive 608 may be transparent, or at least translucent. Alternatively, the secondary backing layer 606 is opaque, but defines multiple channels or holes therethrough to allow light through the secondary backing layer 606. In an embodiment, at least some of the light that is received in the adhesive 608 (after passing beyond the secondary backing layer 606) impinges upon the unpigmented fibers 506 (shown in FIG. 11) in the fixed segments 614 of the translucent strands 602. The light may refract into the unpigmented fibers 506 below the primary backing layer 604, and may be transmitted through the unpigmented fibers 506 across the thickness of the primary backing layer 604 into the free segments 616 of the translucent strands 602 above the top surface 610 of the primary backing layer 604. The light may be emitted from the unpigmented fibers 506 along the free segments 616, which illuminates the translucent strands 602 of the pile 118 to observers above the carpet 104.

Since light is transmitted through the unpigmented fibers 506 in the translucent strands 602 of the pile 118, such light is not conveyed within the primary backing layer 604. The primary backing layer 604 may be transparent, or at least translucent, to allow additional light to be transmitted within the primary backing layer 604, such as light that impinges on the primary backing layer 604 in gaps 621 between adjacent fixed segments 614 of the strands 602, 622. Alternatively, the primary backing layer 604 may be generally opaque, such that most, if not all, light visible to people above the carpet 104 is transmitted through the unpigmented fibers 506 in the translucent strands 602 of the pile 118.

Figure 13:
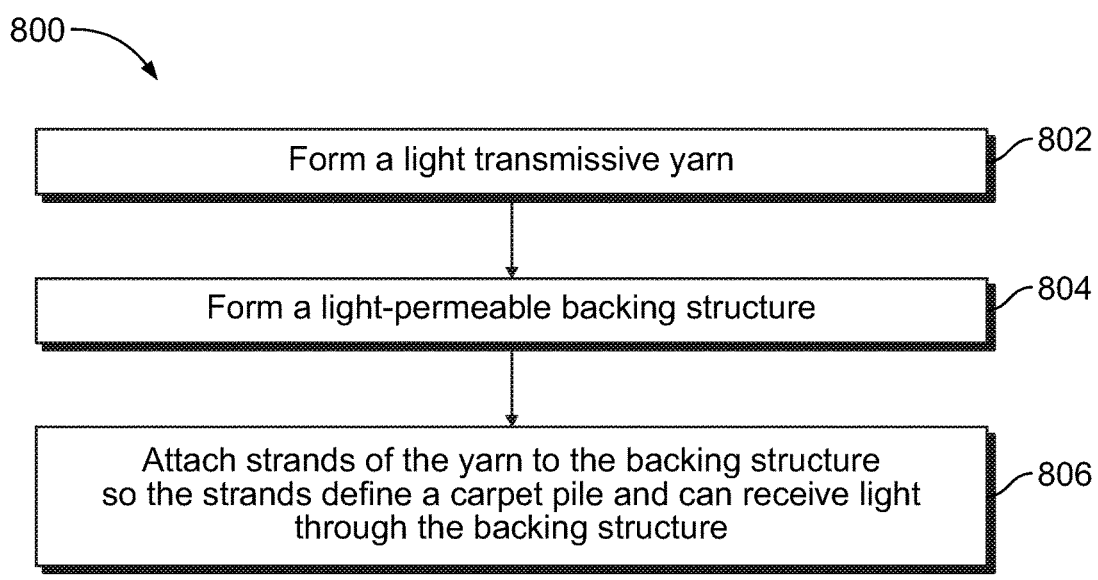
FIG. 13 is a flow chart of a method of producing a light transmissive carpet for an interior cabin of a vehicle according to an embodiment of the present disclosure.

FIG. 13 is a flow chart of a method 800 of producing a light transmissive carpet for an interior cabin of a vehicle according to an embodiment of the present disclosure. The light transmissive carpet produced by the method 800 may be one or more of the embodiments of the light transmissive carpet 104 shown in FIGS. 3, 10, and 11. At 802, a light transmissive yarn is formed. The light transmissive yarn includes a fiber blend of colored fibers and unpigmented fibers that are interspersed in the yarn. The unpigmented fibers are transparent, or at least translucent, and transmit light therethrough at a greater visible light transmittance than the colored fibers. The colored fibers are more opaque than the unpigmented fibers. The yarn may be formed by adding a colorant to some fibers but not all of the fibers. For example, the fibers may be nylon, and may be produced via extrusion. The colored fibers may be formed by extruding the fibers with a pigment, while the unpigmented fibers are extruded without any pigment (or only trace amounts of pigment). The fiber blend is made by twisting or weaving the colored fibers with the unpigmented fibers. The fiber blend may include a designated ratio or range of colored fibers to unpigmented fibers. For example, the unpigmented fibers may make up approximately 5 to 50 percent of the totality of fibers in the yarn, and the colored fibers may make up the remainder of the fibers in the yarn. Optionally, the unpigmented fibers may make up approximately 15 to 30 percent of the totality of fibers, such as 20 or 25 percent.

At 804, a light-permeable backing structure is formed for the carpet. The backing structure includes a primary backing layer, and may also include a secondary backing layer secured to the primary backing layer via an adhesive. The backing structure is formed to allow light across the backing structure by making the backing structure translucent or by forming holes or channels in the backing structure.

At 806, strands of the light transmissive yarn are attached to the backing structure so the strands define a carpet pile. The strands penetrate through at least a portion of the primary backing layer and protrude beyond a top side of the primary backing layer. The strands are attached to the backing structure in a way that allows light from under a bottom side of the backing structure to penetrate the backing structure and impinge upon the strands of the light transmissive yarn. Thus, an optical, light-transmissive pathway is formed between the bottom side of the backing structure and the strands in the pile. For example, light transmitted through the holes in the backing structure and/or through the translucent material of the backing structure can impinge upon fixed segments of the strands embedded within the backing structure. The light may impinge upon the strands within the primary backing layer and/or the adhesive between the primary and secondary backing layers. At least some of the light that engages the strands is refracted into the unpigmented fibers of the light transmissive yarn and is transmitted (via total internal reflection) through the unpigmented fibers. The light may be emitted from the unpigmented fibers along free segments of the strands that protrude above the top side of the backing structure. The light emitted from the free segments of the strands illuminates the pile. Thus, lighting effects can be conveyed through the carpet within the light transmissive yarn of the pile itself.

Figure 14:
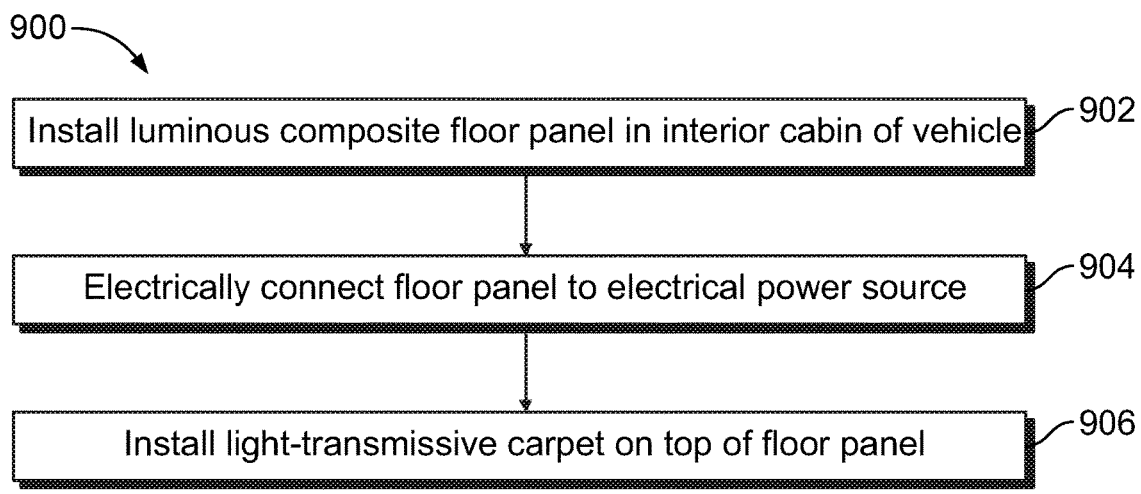
FIG. 14 is a flow chart of a method for installing a carpet display system within an interior cabin of a vehicle according to an embodiment of the present disclosure.

FIG. 14 is a flow chart of a method 900 for installing a carpet display system within an interior cabin of a vehicle. The vehicle may be an aircraft, a rail vehicle, or a different type of passenger vehicle. The carpet display system includes one or more luminous composite floor panels and a light transmissive carpet. The luminous composite floor panel may be one or more of the embodiments of the luminous composite floor panel 102 shown in FIGS. 3-9. The light transmissive carpet may be one or more of the embodiments of the light transmissive carpet 104 shown in FIGS. 3, 4, 11, and 12.

At 902, a luminous composite floor panel is installed in an interior cabin of a vehicle, such as an aircraft or a rail vehicle. Optionally, multiple luminous composite floor panels are produced and installed side-by-side in the cabin to define a floor in the vehicle. Optionally, the floor panels may represent all or a portion of an entryway or an aisle in the cabin.

At 904, the luminous composite floor panel is electrically connected to an electrical power source. The electrical connection may provide both electrical power and control signals (e.g., data) to the light sources on the floor panel. The electrical power source may be an electrical signal distribution system that is elongated along a length of the cabin. Optionally, some of the floor panels may be electrically connected to each other in a daisy chain, so the direct electrical power source for some floor panels may be other floor panels. For example, a first floor panel may be directly connected to an outlet of an electrical signal distribution system, and a second floor panel is indirectly connected to the outlet via the first floor panel.

At 906, a light transmissive carpet is installed in the interior cabin of the vehicle on top of the luminous composite floor panel(s). The carpet may be installed on each luminous composite floor panel using a translucent adhesive that does not significantly diffuse the light emitted from the floor panels towards the carpet.

After the luminous composite floor panels are installed and electrically connected, and the light transmissive carpet is installed on the floor panels, the carpet display system may be operational. During operation, the luminous composite floor panels can be operated to provide static and/or dynamic lighting effects. The lighting effects penetrate across the cover sheet and through the light transmissive carpet. The lighting effects are visible to passengers and staff in the interior cabin of the vehicle. Since the light sources are disposed within the floor panel (e.g., underneath a rigid cover sheet), there is no risk of damage to the light sources from structural loads and impact forces exerted on the light transmissive carpet. The light emitted from the floor panels is configured to be transmitted across a thickness of the light transmissive carpet to provide lighting effects on and/or above the user-facing side of the pile of the carpet.

As described above, embodiments of the present disclosure provide systems and methods for selectively adapting a carpet aesthetic within an aircraft without the need for replacing an existing carpet therein. The systems and methods efficiently and effectively incorporate light-transmissive carpet within an interior cabin of a vehicle, such as an aircraft.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

As used herein, a material or component described using the terms "transparent" or "translucent" means that light can be transmitted through the material and emitted from another side of the material. The term "transparent" indicates a greater amount of light transmittance than the term "translucent," such that a transparent material will have less light distortion, diffusion, and/or attenuation than a translucent material. In this disclosure, the use of the term "translucent" to describe a material or component is not intended, unless explicitly stated, to exclude that the material may also be transparent. For example, a material or component described as "translucent" means that the material or component is at least translucent, and may also be (but does not have to be) transparent.

It is to be understood that the processing or control devices described herein, such as the controller 130, may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the processing devices may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

As used herein, the term "controller," "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein.

Such are exemplary only, and are thus not intended to limit in any way the definition and/or meaning of such terms.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person of ordinary skill in the art to practice the various embodiments of the disclosure, including making and using any devices or systems and performing any incorporated methods. The patentable scope of the various embodiments of the disclosure is defined by the claims, and may include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A composite floor panel comprising:
   a rigid cover sheet having a user-facing side and an underside that is opposite from the user-facing side;
   a rigid base sheet below the underside of the cover sheet;
   a core layer comprising a plurality of honeycomb cells bonded to one another, the core layer disposed between the cover sheet and the base sheet, the core layer having a top side that faces the cover sheet and supports the cover sheet; and
   a plurality of light sources configured to emit light through the cover sheet to provide lighting effects above the user-facing side of the cover sheet, wherein the light sources are disposed below the user-facing side of the cover sheet in alignment with the top side of the core layer.

2. The composite floor panel of claim 1, wherein the cover sheet is translucent.

3. The composite floor panel of claim 1, wherein the cover sheet is opaque and includes a plurality of holes that extend through the cover sheet between the user-facing side and the underside, wherein each of the holes is aligned with an individual one of the light sources.

4. The composite floor panel of claim 1, wherein the light sources comprise light emitting diodes.

5. The composite floor panel of claim 1, wherein the light sources are mounted to the cover sheet along the underside, the cover sheet further including conductive elements embedded therein that are electrically connected to the light sources for providing electric current to the light sources.

6. The composite floor panel of claim 1, wherein the light sources are disposed on an illumination layer located between the cover sheet and the core layer, the illumination layer including one or more substrates on which the light sources and conductive elements are mounted, the conductive elements providing electrical current to the light sources.

7. The composite floor panel of claim 6, wherein the illumination layer includes a single rectangular substrate and the light sources are arranged in a matrix pattern on the substrate.

8. The composite floor panel of claim 6, wherein the illumination layer includes multiple strips of substrates arranged in parallel to one another, each strip including multiple light sources arranged in one or more rows.

9. The composite floor panel of claim 1, wherein the light sources are electrically connected via conductive elements to an edge connector configured to releasably electrically connect with an electrical power source.

10. The composite floor panel of claim 1, wherein the honeycomb cells are composed of carbon fiber or a metal composite.

11. A method comprising:
   forming a rigid, light permeable cover sheet having a user-facing side and an underside that is opposite from the user-facing side;
   providing a core layer and a rigid base sheet below the underside of the cover sheet such that the core layer is between the cover sheet and the base sheet, the core layer comprising a plurality of honeycomb cells bonded to one another, the core layer having a top side that faces the cover sheet and supports the cover sheet; and
   providing a plurality of light sources below the user-facing side of the cover sheet in alignment with the top side of the core layer, the light sources oriented to emit light through the cover sheet for providing lighting effects above the user-facing side of the cover sheet.

12. The method of claim 11, wherein the providing a plurality of light sources between the user-facing side of the cover sheet and the core layer comprises mounting the light sources directly to the cover sheet along the underside and electrically connecting the light sources to conductive elements embedded within the cover sheet.

13. The method of claim 11, wherein the providing a plurality of light sources between the user-facing side of the cover sheet and the core layer comprises mounting the light sources on one or more discrete substrates to define an illumination layer, the method further including providing the illumination layer between the underside of the cover sheet and the core layer.

14. The method of claim 11, wherein the cover sheet is opaque and the cover sheet is formed to allow light therethrough by forming a plurality of holes in the cover sheet, the holes extending fully through the cover sheet between the user-facing side and the underside, wherein the light sources are positioned relative to the cover sheet such that each of the holes is aligned with an individual one of the light sources.

15. The method of claim 11, wherein forming the light permeable cover sheet includes forming the cover sheet out of a translucent material to allow light therethrough.

16. A composite floor panel comprising:
- a cover sheet having a user-facing side and an underside that is opposite from the user-facing side, the cover sheet being rigid and including one or more light transmissive regions configured to allow light through the cover sheet between the underside and the user-facing side;
- a base sheet below the underside of the cover sheet, the base sheet being rigid;
- a core layer comprising a plurality of honeycomb cells bonded to one another, the core layer disposed between the cover sheet and the base sheet, wherein the underside of the cover sheet directly contacts the core layer; and
- a plurality of light sources configured to emit light through the one or more light transmissive regions of the cover sheet to provide lighting effects above the user-facing side of the cover sheet, wherein the light sources are mounted to the cover sheet along the underside, the cover sheet further including conductive elements embedded therein that are electrically connected to the light sources for providing electric current to the light sources.

17. The composite floor panel of claim 16, wherein the cover sheet is composed of carbon fiber and is opaque, the cover sheet including a plurality of holes that represent the one or more light transmissive regions, the holes extending through the cover sheet between the user-facing side and the underside, wherein each of the holes is aligned with an individual one of the light sources.

18. The composite floor panel of claim 16, wherein the cover sheet is composed of fiberglass and is translucent such that the cover sheet represents a single light transmissive region.

19. The composite floor panel of claim 16, wherein the honeycomb cells are composed of carbon fiber.

20. The composite floor panel of claim 16, wherein the core layer has a top side that faces the cover sheet and supports the cover sheet, and the light sources are disposed below the user-facing side of the cover sheet in alignment with the top side of the core layer.

\* \* \* \* \*